United States Patent
Henriksen et al.

(10) Patent No.: US 8,310,772 B2
(45) Date of Patent: Nov. 13, 2012

(54) METHOD AND ARRANGEMENT FOR REDUCING THERMAL EFFECTS IN COMPACT ADJUSTABLE OPTICAL LENSES

(75) Inventors: Lars Henriksen, Tønsberg (NO);
Thomas Spatscheck, Tjøme (NO);
Vladimir Kartashov, Horten (NO); Jon Herman Ulvensøen, Åsgårdstrand (NO)

(73) Assignee: Polight AS, Horten (NO)

( * ) Notice: Subject to any disclaimer, the term of this patent is extended or adjusted under 35 U.S.C. 154(b) by 0 days.

(21) Appl. No.: 13/002,706

(22) PCT Filed: Jul. 9, 2009

(86) PCT No.: PCT/NO2009/000255
§ 371 (c)(1),
(2), (4) Date: Mar. 28, 2011

(87) PCT Pub. No.: WO2010/005315
PCT Pub. Date: Jan. 14, 2010

(65) Prior Publication Data
US 2011/0164330 A1    Jul. 7, 2011

(30) Foreign Application Priority Data

Jul. 11, 2008   (NO) .................................. 20083118

(51) Int. Cl.
*G02B 7/02*    (2006.01)
(52) U.S. Cl. ........ 359/820; 359/811; 359/814; 359/824; 359/665
(58) Field of Classification Search .................. 359/811, 359/814, 820, 616, 665, 666; 348/144, 347
See application file for complete search history.

(56) References Cited

U.S. PATENT DOCUMENTS

| | | | |
|---|---|---|---|
| 4,859,041 A * | 8/1989 | Suda | 359/676 |
| 5,886,332 A | 3/1999 | Plesko | |
| 6,033,132 A * | 3/2000 | Seo | 396/452 |
| 6,188,526 B1 | 2/2001 | Sasaya et al. | |
| 7,359,124 B1 * | 4/2008 | Fang et al. | 359/666 |
| 7,519,284 B2 * | 4/2009 | Chang | 396/89 |
| 7,755,840 B2 * | 7/2010 | Batchko et al. | 359/665 |
| 8,045,280 B2 * | 10/2011 | Henriksen et al. | 359/811 |
| 2002/0048096 A1 | 4/2002 | Melzer et al. | |
| 2002/0149864 A1 | 10/2002 | Kaneko | |
| 2004/0008419 A1 | 1/2004 | Schachar | |

(Continued)

FOREIGN PATENT DOCUMENTS
CN    2706779    6/2005
(Continued)

OTHER PUBLICATIONS

Chinese Office Action, dated Mar. 18, 2010 from CN Appl. 200780034604.6 filed Sep. 21, 2007.

(Continued)

*Primary Examiner* — Loha Ben
(74) *Attorney, Agent, or Firm* — Knobbe Martens Olson & Bear, LLP

(57) ABSTRACT

The present invention provides thermal compensation for a lens assembly comprising a polymer lens body. Polymers do have different thermal expansion coefficients which makes it necessary to compensate for thermal expansions to keep optical characteristics of such lenses within specifications when used under different environmental conditions. Also, it is necessary to provide thermal compensation during manufacturing of such lenses due to high temperatures during manufacturing steps.

12 Claims, 4 Drawing Sheets a b

U.S. PATENT DOCUMENTS

| | | |
|---|---|---|
| 2005/0036195 A1 | 2/2005 | Nishioka |
| 2005/0133789 A1 | 6/2005 | Oh et al. |
| 2006/0028734 A1 | 2/2006 | Kuiper et al. |
| 2006/0133789 A1 | 6/2006 | Yu |
| 2006/0139585 A1 | 6/2006 | Van Der Wijst |
| 2007/0211349 A1 | 9/2007 | Chen |
| 2007/0263293 A1 | 11/2007 | Batchko et al. |
| 2007/0299487 A1 | 12/2007 | Shadduck |
| 2008/0144185 A1 | 6/2008 | Wang et al. |
| 2008/0277480 A1 | 11/2008 | Thuries et al. |
| 2010/0091389 A1 | 4/2010 | Henriksen et al. |
| 2010/0133230 A1 | 6/2010 | Henriksen et al. |
| 2011/0096411 A1 | 4/2011 | Henriksen et al. |
| 2011/0149408 A1 | 6/2011 | Hahgholt et al. |
| 2011/0149409 A1 | 6/2011 | Haugholt et al. |

FOREIGN PATENT DOCUMENTS

| | | |
|---|---|---|
| DE | 3644225 | 7/1987 |
| EP | 1804109 A1 | 7/2007 |
| GB | 2163864 | 3/1986 |
| JP | 62151824 | 7/1987 |
| JP | 01140118 | 6/1989 |
| JP | 02178602 | 7/1990 |
| JP | 1062609 | 3/1998 |
| JP | 11133210 | 5/1999 |
| JP | 200081503 | 3/2000 |
| JP | 2000249813 | 9/2000 |
| JP | 2001257932 | 9/2001 |
| JP | 2002243918 | 8/2002 |
| JP | 2002239769 | 8/2002 |
| NO | 20064271 | 9/2006 |
| WO | WO 2004/038480 | 5/2004 |
| WO | WO 2004059364 | 7/2004 |
| WO | WO 2004/099847 A1 | 11/2004 |
| WO | WO 2005085930 | 9/2005 |
| WO | WO 2007017089 | 2/2007 |
| WO | WO 2008035983 | 3/2008 |
| WO | WO 2008035984 | 3/2008 |
| WO | WO 2008/044937 | 4/2008 |
| WO | WO 2008/044938 | 4/2008 |
| WO | WO 2008/100153 A1 | 8/2008 |
| WO | WO 2008/100154 | 8/2008 |

OTHER PUBLICATIONS

Extended EP Search Report for EP Application 09794692.5, mailed on Jan. 5, 2012.

* cited by examiner

T = +20°C       T = +80°C

METHOD AND ARRANGEMENT FOR REDUCING THERMAL EFFECTS IN COMPACT ADJUSTABLE OPTICAL LENSES

CROSS REFERENCE TO RELATED APPLICATIONS

This application claims the benefit and priority to and is a U.S. National Phase Application of PCT International Application Number PCT/NO2009/000255, filed on Jul. 9, 2009, designating the United States of America and published in the English language, which is an International Application of and claims the benefit of priority to Norwegian Patent Application No. 20083118, filed on Jul. 11, 2008. The disclosures of the above-referenced applications are hereby expressly incorporated by reference in their entireties.

FIELD OF THE INVENTION

The present invention is related to a method and arrangement for reducing thermal effects in compact adjustable optical lenses, and especially to a method and arrangement for reducing thermal effects in an optical lens comprising a deformable lens body made out of soft polymer, and wherein control signals actuate actuators deforming the lens body, thereby enabling adjustments of focal length, providing zooming etc. of an optical lens assembly.

There are many issues to be solved which are associated with adjustable optical elements, wherein a soft polymer is deformed by an actuator layer structure that is located adjacent to a surface of the soft polymer constituting the lens body. Polymers in general have the disadvantage of having a large thermal expansion coefficient, compared to inorganic materials such as metals, oxides and ceramics. Especially hybrid materials, built up of materials with large differences in thermal expansion, such as glass, silicon and polymer, will have problems both during operation and during manufacturing due to the large differences in thermal expansion. The present invention is related to both active and passive methods and arrangements of thermal compensation for adjustable lenses, prisms and other optical elements, comprising both soft polymers and stiffer materials such as glass, ceramics and metals, etc. so that the adjustable lens both can be manufactured and mounted using wide temperature ranges. For example, according to an example of embodiment of the present invention, manufacturing can be done at temperatures as high as 300° C. and the lens may be operated at temperatures ranging from −25 to 80° C., or wider.

There is an increasing demand for low cost, high volume miniature lenses in an ever increasing number of applications. The popular use of cameras in mobile phones provides a market for millions of lenses. In order to exploit the increasing resolution of miniature cameras, there is an increasing need for adjustable lenses. Adjustable lenses can provide advanced functionalities, such as auto focus or zoom, in micro cameras. A demanding challenge for lenses in general and adjustable lenses in particular, is the demand for high volume manufacturing processes, such as semiconductor wafer processes. This invention relates to solutions for problems that will arise during operation and manufacturing of adjustable lenses or prisms, wherein a soft polymer constitutes the main part of the lens body. Adjustable optical elements with a deformable soft polymer are described for example in for NO20064271, DE3644225A and NO20070797.

DESCRIPTION OF THE PRIOR ART

The adjustable lens illustrated in FIG. 1 comprises five elements; an actuator (for example a piezo ring) 1, mounted on a thin flexible membrane (typically glass) 2, in contact with a soft polymer 3, and preferably a stiffer substrate on the other side 5. The actuator deforms the thin flexible membrane; creating a lens shape. The deformable polymer is attached to the membrane, and the whole glass-polymer-glass structure functions as an adjustable lens. The adjustable lens design illustrated in FIG. 1 has the advantage of being producible using wafer processes, enabling high volume manufacturing at low unit costs. The presence of a continuous membrane made of glass or other relatively stiff, but flexible, materials in combination with a continuous or semi-continuous rigid support material 4 enables relatively easy handling in wafer scale processing, in addition to providing a support structure enabling assembly in a camera system, for example. Other adjustable optical elements may be produced employing basically the same principles, with modifications in for example the actuator geometry and the flexible membrane thickness. An example of an adjustable prism is described in patent application NO20070797.

Soft polymers used in the prior art techniques could have a coefficient of thermal expansion of >500 ppm/K. The large difference compared to typical values for example glass or silicon (2-10 ppm/K) and even stiff polymer materials (typically 50-200 ppm/K), will cause problems in a hybrid construction containing a mixture of such materials, both during manufacturing and mounting and during continuous operation. Typical operation temperatures for a mobile camera will be −25 to 55 degrees Celsius, while manufacturing temperatures could go as high as 260 degrees Celsius for brief periods of time.

It is possible to measure or simulate the effect of temperature increases for a lens assembly as depicted in FIG. 1. Increasing the temperature will cause a bulging of the thin glass membrane that could be several times larger than the bulging that arises from applying a voltage to the actuator. An exaggerated schematic illustration is given in FIG. 2. The adjustable lenses and prisms disclosed in prior art would then have a very narrow operating temperature range, which will make the practical use of the components very limited.

In the adjustable lens design illustrated in FIG. 1, a polymer is enclosed in a cavity. Alternative designs suggest only partially filled cavity (seen on the right hand side of FIG. 1, where 6 is an air filled void, which is also stated as reducing the effects of thermal expansion (PCT/NO2007/000332 and 000333). However, both simulated and experimentally verified results indicate that a partially filling of polymer in an enclosed cavity will not be sufficient compensation means for thermal effects. An example of simulated resulting compensating effect is shown schematically in FIG. 2.

As illustrated in FIG. 2, and which also is evident for a person skilled in the art, the proposed prior art solution for compensating thermal expansion will not be sufficient as long as the lens material is a solid polymer. If the lens design comprises a liquid filled lens, as described for example in patents JP2002239769, JP2001257932, and JP2000081503, providing relief channels and space for expanding liquid would be sufficient. For solid polymers used as lens body, which are of course used for their advantageous properties, especially with regards to manufacturing and durability, stability etc., where one or more surfaces are physically attached to surrounding surfaces (for example the glass surfaces in the above described adjustable lenses), having a confined open space for the polymer to expand into will not be sufficient.

BRIEF SUMMARY OF THE INVENTION

It is therefore an aspect of the present invention to provide both passive and active methods and arrangements for compensating or minimizing the effect of thermal expansion for adjustable optical elements which are made up of a combination of materials with large differences in thermal expansion.

It is another aspect of the present invention to provide solutions for making adjustable lenses, prisms and other optical elements that can be produced using high volume manufacturing processes, in wafer scale processes, integratable with fixed lenses and image sensors in wafer scale assembly of a complete micro camera.

Another aspect of the present invention is to provide an adjustable lens or prism component that withstands the highly desirable lead free soldering reflow processes, which takes place at temperatures higher than 250° C. Having a micro camera that can withstand this standard process for mounting electronic components onto chip boards, is essential for the implementation of high volume/low cost manufacturing of especially consumer electronics, such as mobile cameras etc.

DETAILED DESCRIPTION OF THE PREFERRED EMBODIMENTS

Figure 1:
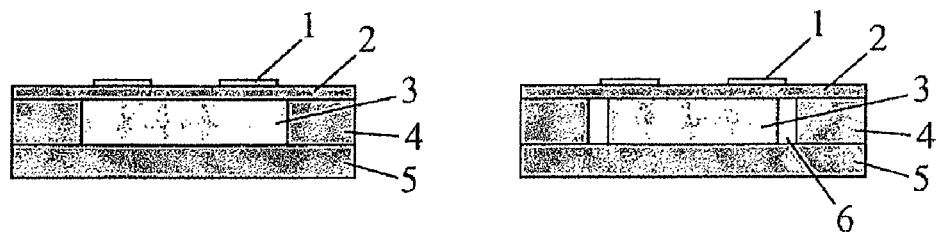
FIG. 1 illustrates examples of prior art adjustable lenses comprising lens bodies made out of polymer.
Figure 2:
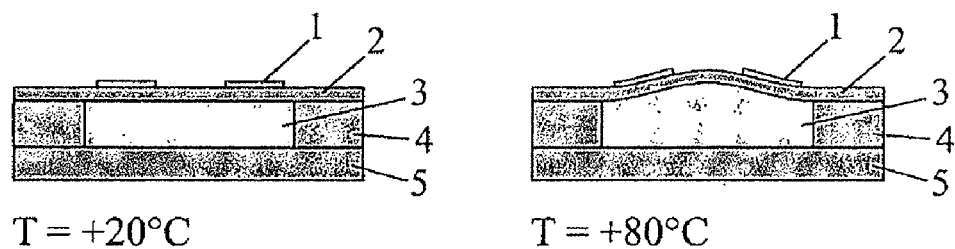
FIG. 2 illustrates the effect of thermal expansion in a prior art lens assembly.
Figure 3:
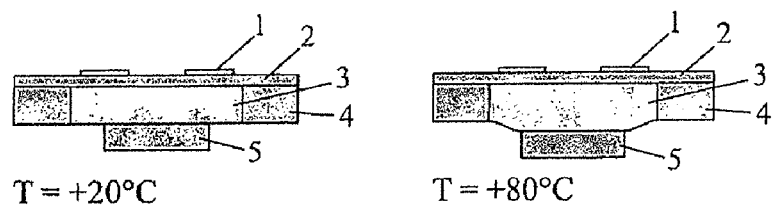
FIG. 3 illustrates an example of embodiment of the present invention.

In an example of embodiment of the present invention a section of the bottom glass element 5 is cut free from the supporting structures, as illustrated in FIG. 3. The polymer in this case fills the majority of the cavity created by the thin glass membrane and the rigid walls. The bottom element 5 may be glass, or any material that is optically transparent and stiffer than the soft polymer 3. Other materials that could be used are for example moulded plastics and relatively stiff elastomers.

Figure 4:
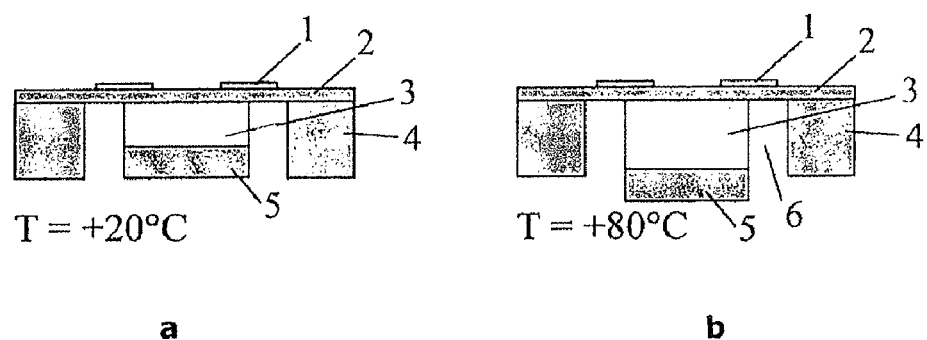
FIG. 4a illustrates another example of embodiment of the present invention.
FIG. 4b illustrates another example of embodiment of the present invention.

In an other example of embodiment of the present invention, illustrated in FIG. 4a, the polymer does not fill the whole cavity, but is provided in the optical light path of the lens or prism.

Another variation of this embodiment is to include an element with optical power as the bottom glass element, as illustrated in FIG. 4b. This is particularly advantageous when the adjustable lens is part of an optical objective, with one or more fixed lenses, as the bottom optical interface contributes to the total optical power of the objective, which has the function of collecting all light in focus downwards to a surface of an image sensor, for example.

Figure 6:
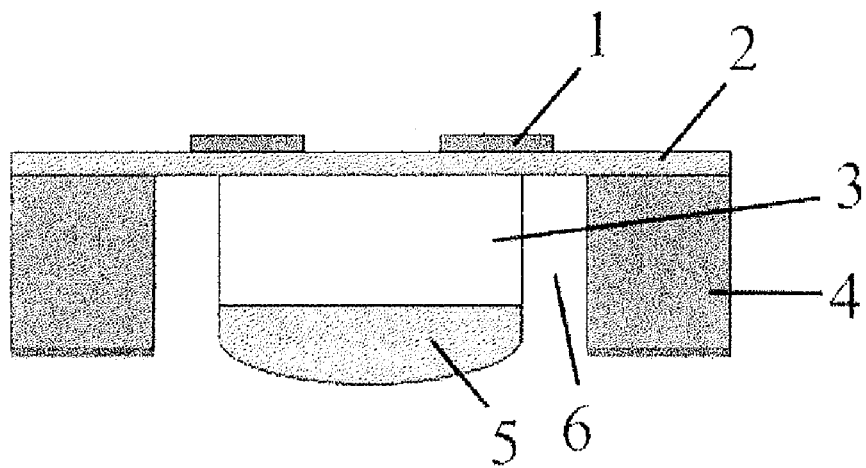
FIG. 6 illustrates an example of a lens having a concave surface.
Figure 7:
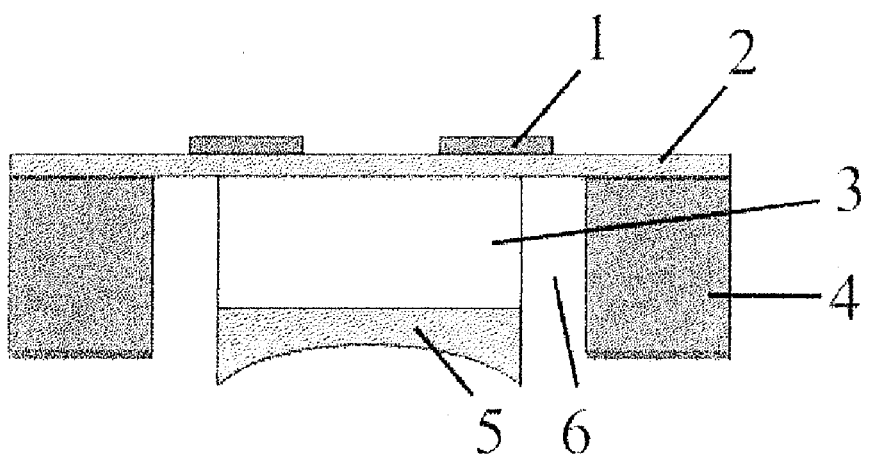
FIG. 7 illustrates an example of a lens having a convex surface.

According to another aspect of the present invention it is an advantage from a thermal compensation point of view to have a concave or a convex surface on the bottom glass element. FIG. 6 illustrates a convex shape while FIG. 7 illustrates a concave shape." Due to the thermal expansion, there will be a slight shift of the optical interfaces in the direction of the optical axis. This shift might in special lens designs cause unwanted effects, such as poor focus in the image plane or other aberration errors. A concave or convex shape—depending on the design of the whole camera objective—of the bottom glass of the thermally compensated adjustable lens will in some cases reduce such unwanted effects.

Figure 5:
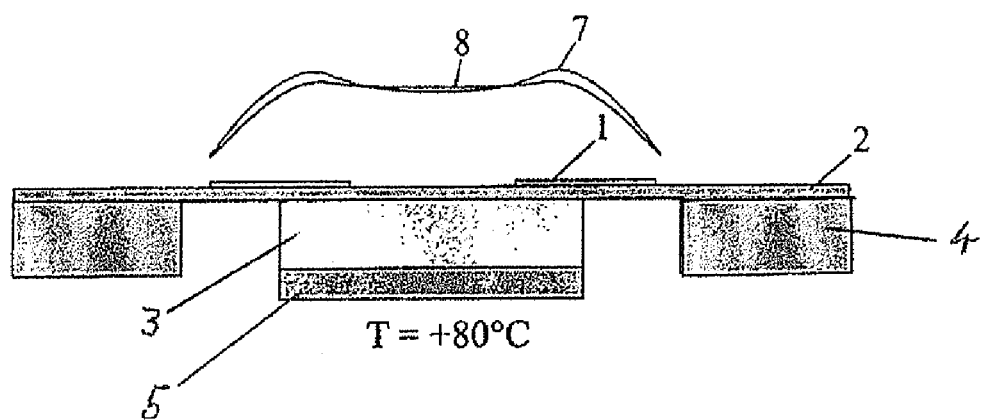
FIG. 5 illustrates another example of embodiment of the present invention.

In all the above presented embodiments, it might be advantageous to provide a small voltage to the piezo actuator as a function of temperature. This could be necessary for certain designs in order to achieve an even better compensation for thermal expansion. An example of lens profiles with (8) and without (7) such correction voltage is shown in FIG. 5.

In order to manufacture the thermally compensated adjustable lenses in high volumes, it is evident to carry out processing on wafers, preferably using standard semi-conductor processing equipment.

All the above mentioned embodiments will also solve the problems related to thermal expansion for other adjustable optical elements than lenses, most notably adjustable prisms, but also for other adjustable optical elements in which an actuator structure (for example a piezo actuator mounted onto a glass membrane) is attached to both a soft polymer and supporting structures for handling during manufacturing and mounting in a imaging system (camera), where large differences in thermal expansion will cause unwanted effects. Examples of such adjustable optical elements could be filters and gratings.

The embodiments above have been described intended to work with circularly shaped or similar lenses and prisms. The same principles for thermal compensation will work also with cylindrical lenses or other lens body geometries.

According to another aspect of the present invention, when the soft polymer is shaped with two parallel surfaces perpendicular to the optical axis, this will ensure that thermal expansion occurs parallel to the optical axis, which will not cause any distortion of the angle. In special instances, it may be desirable to have a non-parallel structure of the soft polymer, and thermal expansion will in these cases occur with a slight angular distortion from the optical axis, which can be compensated for by other optical means as known to a person skilled in the art.

The invention claimed is:

1. An optical lens assembly comprising a soft and deformable lens body confined in a cavity bounded by a first side comprising an actuator on a thin glass surface supported by sidewalls, wherein a second surface constituting a bottom side of the cavity is arranged as an attached transparent plate onto the lens body such that there is an opening between the side walls and the edges of the transparent plate.

2. The optical lens assembly according to claim 1, wherein the soft and deformable lens body is arranged in an optical light path of the optical lens assembly and the lens body is located in the cavity with an opening around the lens body and the sidewalls.

3. The optical lens assembly according to claim 1, wherein the attached transparent plate has optical power.

4. The optical lens assembly according to claim 1, wherein the attached transparent plate has a surface intersecting an optical axis in the optical lens assembly and the surface has a convex shape.

5. The optical lens assembly according to claim 1, wherein the attached transparent plate has a surface intersecting an optical axis in the optical lens assembly and the surface has a concave shape.

6. The optical lens assembly according to claim 1, wherein the deformable lens body comprises two opposite located parallel surfaces perpendicular to a same optical axis in the lens body.

7. The optical lens assembly according to claim 1, wherein the deformable lens body comprises at least two opposite located surfaces intersecting a same optical axis in the lens body that are non-parallel.

8. The optical lens assembly according to claim 1, wherein the actuator is applied a bias voltage and the bias voltage is proportional to temperature of the optical lens assembly.

9. A method for reducing thermal effects in a compact adjustable optical lens assembly, wherein the optical lens assembly comprises a soft and deformable lens body confined in a cavity bounded by a first side comprising an actuator on a thin glass surface supported by sidewalls, comprising:

arranging a bottom transparent plate of the lens assembly in a movable relationship with the sidewalls.

10. The method according to claim 9, wherein the movable relationship is provided for by having an opening between the edges of the transparent plate and the sidewalls.

11. The method according to claim 9, further comprising:
measuring the temperature of the lens assembly, using this measurement to provide a proportional bias voltage as a function of the temperature, and applying this bias voltage on the actuator.

12. The method according to claim 9, further comprising:
providing optical power in the bottom transparent plate, wherein the optical power is designed according to total optical requirements of the lens assembly.

* * * * *